(12) United States Patent
Maleh (10) Patent No.: US 11,695,469 B2
(45) Date of Patent: Jul. 4, 2023

(54) COMMANDING AUTONOMOUS VEHICLES USING MULTI-LINK SATELLITE NETWORKS

(71) Applicant: Navyx Corporation, Menlo Park, CA (US)

(72) Inventor: Kenda Maleh, San Jose, CA (US)

(73) Assignee: NAVYX CORPORATION, Menlo Park, CA (US)

( * ) Notice: Subject to any disclaimer, the term of this patent is extended or adjusted under 35 U.S.C. 154(b) by 0 days.

(21) Appl. No.: 17/358,328

(22) Filed: Jun. 25, 2021

(65) Prior Publication Data

US 2022/0302996 A1     Sep. 22, 2022

Related U.S. Application Data

(60) Provisional application No. 63/164,483, filed on Mar. 22, 2021.

(51) Int. Cl.
*H04B 7/185* (2006.01)
*H04W 4/021* (2018.01)

(52) U.S. Cl.
CPC ........ *H04B 7/18513* (2013.01); *H04W 4/021* (2013.01)

(58) Field of Classification Search
CPC ....... H04B 7/185–195; H04B 7/18513; H04W 4/021
See application file for complete search history.

(56) References Cited

U.S. PATENT DOCUMENTS

| | | | |
|---|---|---|---|
| 5,952,941 A | 9/1999 | Mardirossian | |
| 11,113,766 B1* | 9/2021 | Baker | G06V 20/52 |
| 2008/0106439 A1 | 5/2008 | Breslau et al. | |
| 2010/0074555 A1* | 3/2010 | Diaz | G06V 20/176 382/284 |
| 2015/0179062 A1* | 6/2015 | Ralston | G08G 1/096844 701/117 |
| 2015/0355334 A1* | 12/2015 | Stubbs | G01S 19/14 342/357.395 |
| 2016/0315702 A1* | 10/2016 | Roberts | H04L 27/04 |
| 2018/0012433 A1* | 1/2018 | Ricci | B60L 53/65 |
| 2018/0253981 A1 | 9/2018 | Raptopoulos et al. | |
| 2018/0284780 A1* | 10/2018 | McWhirter | G01S 7/4861 |
| 2019/0217850 A1* | 7/2019 | Kai | B60W 10/26 |
| 2019/0362147 A1* | 11/2019 | Adam | G06V 20/188 |
| 2020/0379118 A1* | 12/2020 | Reid | G01S 19/02 |

OTHER PUBLICATIONS

International search report and written opinion of the international searching authority dated Jun. 24, 2022 in the PCT application No. PCT/US2022/21056, (9 pgs).

* cited by examiner

*Primary Examiner* — Raymond S Dean
(74) *Attorney, Agent, or Firm* — North Weber & Baugh LLP; Michael North (57) ABSTRACT

A multi-link satellite processor is described that provides command or control information to a vehicle via multi-link satellite downlink signals. Embodiments of the invention provide an Earth-based multi-link satellite processor that process information to generate the command information and to transmit the command information to commercial satellite or low-Earth orbit and satellites. The command information is provided to a vehicle via the multi-link satellite downlink signal in which one or more commercial satellites and at least one low-Earth orbiting satellite are used to generate the multi-link satellite downlink signal.

19 Claims, 5 Drawing Sheets

COMMANDING AUTONOMOUS VEHICLES USING MULTI-LINK SATELLITE NETWORKS

CROSS REFERENCE TO RELATED APPLICATION

The application claims priority to Provisional Application Ser. No. 63/164,483 entitled "Method for Commanding Autonomous Vehicles with Satellite Network," filed on Mar. 22, 2021, which application is incorporated by reference herein.

TECHNICAL FIELD

This disclosure relates to systems, methods and devices for using a plurality of disparate satellite network communications to command or enhance control of a plurality of autonomous or semi-autonomous vehicles and objects using database processing, artificial intelligence (AI) and predictive analytics. These systems, methods and devices enable the vehicles to make better decisions and operate with greater efficiency and safety.

BACKGROUND

Technology innovations over the last several years have finally enabled the development and deployment of everything from driverless cars to pilotless drones and other objects (so-called "autonomous" vehicles). These autonomous and semi-autonomous vehicles and objects exhibit various degrees of self-controlled, independent operation, aided by technologies internal to (on-board) the vehicles like cameras, antennas, radar, LiDAR, and other sensors, as well as exterior technologies like GPS (Global Positioning System), GNSS (Global Navigation Satellite System), terrestrial networks (like cellular 5G, LTE, etc.), and otherwise.

Efficient and safe operation of a vehicle depends on the reliability of the sensors and the quality of the data they provide for autonomous operation. On-board vehicle sensors are often sufficient for general operation, but have inherent limitations, including camera impairment and radar malfunction during inclement weather, inability to sometimes detect other objects and road conditions such as black ice, risks when changing lanes and making other maneuvers, and otherwise.

SUMMARY

The present disclosure relates in one embodiment to software and systems that communicate with a plurality of satellite networks, and the invention's multi-link satellite processor processes the satellite data utilizing database processing, artificial intelligence (AI) and predictive analytics to enhance the commands for a plurality of vehicles or objects.

The present disclosure relates in another embodiment to software and systems that can assume complete control of a vehicle for the purposes of maneuvering (like changing lanes) without dependence on the vehicle's cameras, sensors, antennas and other hardware and software, and in the event of a vehicle malfunction, including for vehicles that may be sensor-light or sensor-free and/or without using actuators, which offers economic benefits to vehicle cost.

The present disclosure relates in another embodiment to software and systems that determine how the satellites communicate with each other based on the geographic position of the vehicles and their surrounding objects. The multi-link satellite processor requests geofencing capability using identified satellites in the vehicle's preferred proximity to pin-point vehicle location, and utilizes database processing, artificial intelligence (AI) and predictive analytics to provide vehicles with information related to the specific surrounding geofenced area and nearby objects to support vehicle decision making and movements.

The present disclosure relates in another embodiment to software and systems that provide predictive information to the vehicles about areas that vehicle cameras can't see and that sensors can't detect, which also helps predict areas outside of the vehicles' radar, sensors, antennas, and camera range covered by other satellites, so the multi-link satellite processor can predict what will happen next, and command the vehicle accordingly.

The present disclosure relates in another embodiment to software and systems that utilize satellites' on-board computers, which can signal vehicles to enable telemetry and activate GPS (Global Positioning System), GNSS (Global Navigation Satellite System), and otherwise, to recognize the changing position of the vehicle, nearby vehicles, and the environment.

The present disclosure relates in another embodiment to software and systems that utilize bi-directional data flow between satellites using inter-satellite optical link (ISOL) or other method to facilitate geographic coverage and to serve autonomous vehicles in the various areas, and the embodiments of the multi-link satellite processor determines the relevance of the data and what should be sent via command to the vehicles.

The present disclosure relates in another embodiment to software and systems where the vehicles are assisted in detecting surrounding objects using CommNets' data from Pulse-Doppler radar, sound waves or other method to help detect distance between vehicles and other objects, and the data can be transmitted to the multi-link satellite processor directly from CommNets or via PrivNets.

The present disclosure relates in another embodiment to software and systems where data is collected from, generated, and processed using database processing, artificial intelligence (AI) and predictive analytics from a plurality of satellites that may have different features and functionality, including detecting stationary versus nonstationary objects, and the size of objects, by sending and receiving frequency mounted wave radar or otherwise, and then commands are provided to the vehicles.

The present disclosure relates in another embodiment to software and systems where images are requested from and provided in real-time or near-real-time from PrivNets or CommNets to embodiments of the multi-link satellite processor and are processed with the capability of zooming into areas surrounding the vehicle, and to make decisions the satellite imaging will be substituted for the vehicle's camera images depending on its capabilities, and eventually use all images from satellites when possible, and process them and send commands to the vehicle to make decisions, or in the event of vehicle malfunction, or camera failure or impairment.

The present disclosure relates in another embodiment to software and systems where communications between embodiments of the multi-link satellite processor, satellites and vehicles are global, or in areas of geographic coverage. Besides aforementioned communications between the multi-link satellite processor, satellites and vehicles, communications may also occur via relaying data between multiple other satellites (besides possibly PrivNets and CommNets), or from satellite to ground and then transmitted via ground-based, air-based or other communications such as fiber optic, microwave, radio or sound waves, lasers/optical, LED-based visible light communications (VLC), vehicle-to-vehicle (V2V), or other method, or utilize space station hubs like Earth-based ground stations or otherwise.

The present disclosure relates in another embodiment to software and systems of the embodiments of the invention that can operate ubiquitously, regardless of location or host, including in stationary and mobile data centers, ground stations, on planes and aerial vehicles, boats, and otherwise, such as Vehicle-Mounted Earth Stations (VMES) and Satellite On-The-Move (SOTM) terminals, including the multi-link satellite processor's software running in/on the satellites (like PrivNets, CommNets, or otherwise), and in/on the vehicles themselves.

The present disclosure relates in another embodiment to software and systems where reporting and charting of data, processing, and control concerning the autonomous vehicles, PrivNets and/or CommNets occurs via software, a mobile device-based application or website. Such software, application or website can be operated on a computer, mobile phone, wearable device, or other equipment.

BRIEF DESCRIPTION OF THE DRAWINGS

References will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments. Items in the figures may be not to scale.

DETAILED DESCRIPTION OF EMBODIMENTS

In the following description, for purposes of explanation, specific details are set forth in order to provide an understanding of the invention. It will be apparent, however, to one skilled in the art that the invention can be practiced without these details. Furthermore, one skilled in the art will recognize that embodiments of the present invention, described below, may be implemented in a variety of ways, such as a process, an apparatus, a system, a device, or a method on a tangible computer-readable medium.

Components, or modules, shown in diagrams are illustrative of exemplary embodiments of the invention and are meant to avoid obscuring the invention. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," or "communicatively coupled" shall be understood to include direct connections, indirect connections through one or more intermediary devices, and wireless connections.

Reference in the specification to "one embodiment," "preferred embodiment," "an embodiment," or "embodiments" means that a particular feature, structure, characteristic, or function described in connection with the embodiment is included in at least one embodiment of the invention and may be in more than one embodiment. Also, the appearances of the above-noted phrases in various places in the specification are not necessarily all referring to the same embodiment or embodiments.

The use of certain terms in various places in the specification is for illustration and should not be construed as limiting. A service, function, or resource is not limited to a single service, function, or resource; usage of these terms may refer to a grouping of related services, functions, or resources, which may be distributed or aggregated. Furthermore, the use of memory, database, information base, data store, tables, hardware, and the like may be used herein to refer to system component or components into which information may be entered or otherwise recorded.

Further, it shall be noted that: (1) certain steps may optionally be performed; (2) steps may not be limited to the specific order set forth herein; (3) certain steps may be performed in different orders; and (4) certain steps may be done concurrently.

In this document, "autonomous", "self-driving", "self-controlled", "driverless" and "pilotless" mean a vehicle or object with software, hardware and/or equipment that enables its operation to be autonomous or semi-autonomous (e.g., largely or totally independent of a human operator), but may benefit from time to time from outside information, commands and control, such as communications with the invention, satellites, and possibly other systems and vehicles.

"Vehicles" or "objects" (or singular) mean objects that are ground-based, water-based, submerged, aerial, space-based and otherwise, including cars, trucks, ships, submarines, drones, airplanes, aerial and sub-orbital objects, robots, and other objects, including autonomous or semi-autonomous vehicles offered by various vendors.

"PrivNets" means low-Earth orbit [LEO] satellites and satellite networks.

"CommNets" means satellites and satellite networks other than PrivNets, including commercial satellites.

Signals and data flow depicted throughout this document used by embodiments of the invention for communication with satellites and vehicles are intended to be encrypted for security purposes, as applicable.

Figure 1:
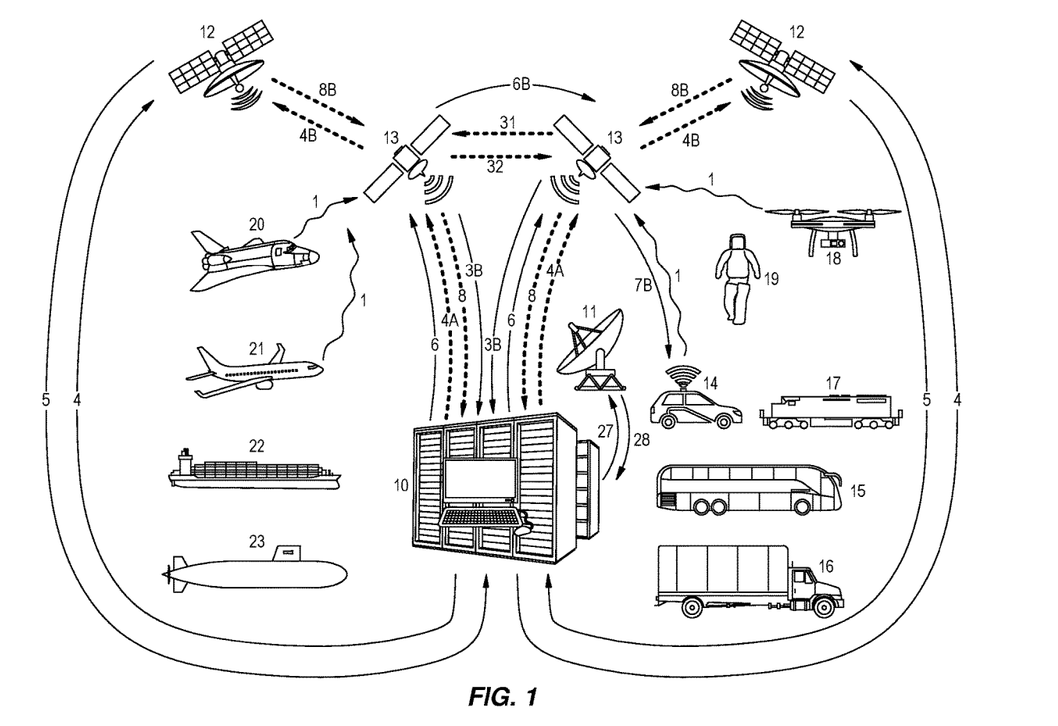
FIG. 1 depicts the general operation of various embodiments the invention, including incorporating communications with a plurality of disparate satellite networks and commanding a plurality of vehicles and objects via database processing, artificial intelligence (AI) and predictive analytics software in the invention.

References to 14 (an automobile, for example) in this document shall also mean any other kind of vehicles or objects, including buses 15, trucks 16, trains 17, drones 18, robots 19, space and aerial vehicles 20, airplanes 21, ships 22 and submarines 23 as shown in FIG. 1, unless otherwise noted.

Referring to FIG. 1, the present disclosure relates in one embodiment to a multi-link satellite processor 10 that processes and analyzes real-time or near-real-time data from a plurality of satellite networks that communicates via satellite dish or other method to transmit and receive data 11 and communicate with the multi-link satellite processor 10 via 27, 28, including PrivNets 13, and communicates with 4, 5 and improves data quality from CommNets 12, and provides commands 6 via PrivNets 13 to 7B vehicles or objects 14. The multi-link satellite processor 10 enables improved decision making for vehicles 14 about location, road conditions, surrounding objects, and other information in proximity of and in the direction of the moving vehicle, and reduces dependence on vehicle cameras, sensors, radar, antennas and other hardware and software, such as when there is a malfunction with the vehicle, cameras, sensors or other devices.

In FIG. 1, the multi-link satellite processor 10 is requesting and synchronizing data 4 from CommNets 12, which transmits 5 such as weather information, the location and size of surrounding objects to the vehicles 14, and images proximate to vehicles 14, distance between vehicles 14, speed and acceleration, and other data. The multi-link satellite processor 10 may receive data 5 directly from CommNets 12 with communications via 11, 27, 28, or other signal source or method, or via PrivNets 13, 3B, 4A, 4B, 8, 8B.

FIG. 1 also illustrates, once the autonomous vehicle 14 starts-up, a code that is generated and transmitted 1 via its sensors (radar, LiDAR, or other device), antennas, radio waves or otherwise to the preferred positioned satellite(s) such as PrivNets 13 that covers a preferred geographic area of the vehicle. This code 1 contains information about the vehicle's 14 unique identification, location, speed and acceleration, timing, and maneuvering (such as changing lanes, braking, changing speeds, object recognition, summoning from parking, or other action). After PrivNets 13 receives a code 1 from the vehicle 14, the code is transmitted from PrivNets 13 or its on-board signal computer (29 in FIG. 5) to 3B the multi-link satellite processor 10. Next, the multi-link satellite processor 10 processes the data to generate 6 to PrivNets 13 to transmit 7B to vehicle 14. The multi-link satellite processor 10 also can process the data and transmit a request 4A to PrivNets 13 to enable telemetry 7B to track the vehicle 14 and activate or initiate GPS (Global Positioning System), GNSS (Global Navigation Satellite System) or otherwise to recognize the changing position of the vehicle and the environment.

Figure 2:
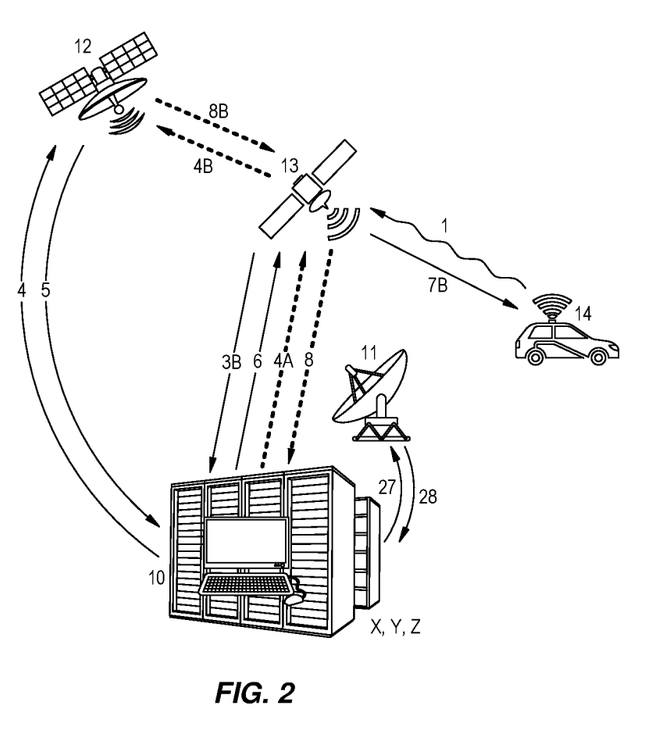
FIG. 2 illustrates selected multi-link satellite processor systems functionality with information requested and received from a plurality of satellite networks combined with autonomous vehicle data to process using database processing, artificial intelligence (AI) and predictive analytics to provide commands to the vehicle according to various embodiments of the invention.

Referring to FIG. 2, in multi-link satellite processor 10: X is the database processing and storing of codes from the vehicle 14 including unique vehicle identification code, timing, speed and acceleration, and otherwise, and also stores signal codes received from CommNets 12 and PrivNets 13; Y is the processing and analytics of the data from X, which matches the vehicle 14 data with the corresponding satellite 12, 13 data; Z is the data and signal 6 created by the multi-link satellite processor 10 to command 7B the vehicle 14.

In FIG. 2, the multi-link satellite processor 10 determine what vehicle's code matches what signals from CommNets and PrivNets. The multi-link satellite processor 10 processes data stored in X from 5 CommNets 12 and 8 from PrivNets 13 to match the data from 3B using Y. Then, Z combines multiple processed signals from Y to create the command 6 that it sent to PrivNets 13, and transmits to the vehicle 14 the command 7B instructing it to slow down, change lanes, brake, or otherwise. (FIG. 1 discussed 4, 4A, 4B, 8B, 11, 27, 28.)

Figure 3:
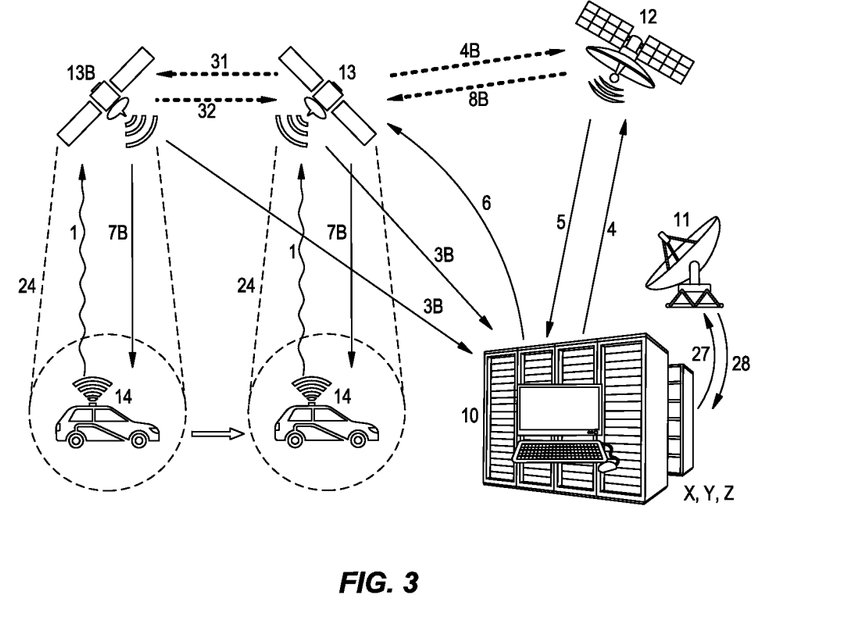
FIG. 3 shows the requesting of data from proximate satellites to geofence and providing data for a selected geographic area or areas around the vehicles for data processing by the multi-link satellite processor according to various embodiments of the invention.

Referring to FIG. 3, the vehicle 14 transmits code 1 with its location to PrivNets 13. Then, Y determines which satellite(s), including one or more PrivNets 13 or CommNets 12, are in preferred proximity to vehicle 14. Next, the multi-link satellite processor transmits signal 6 to one or more preferred proximity PrivNets 13 (or CommNets 12) to geofence 24 the vehicle 14. When geofencing is in effect, PrivNets 13 sends a command 7B to vehicle 14 to move or otherwise. The multi-link satellite processor 10 provides geofencing capability to pin-point vehicle 14 locations using identified satellites 12, 13 in the preferred proximity, and utilizes database processing, artificial intelligence (AI) and predictive analytics to provide vehicles 14 with information 7B related to the specific surrounding geofenced area 24, and nearby objects, to enhance or command vehicle decision making and movements. The multi-link satellite processor 10 also commands how the satellites 12, 13 communicate with each other based on the geographic position of the vehicles 14 and their surrounding objects. (FIG. 1 and FIG. 2 discussed 3B, 4, 4B, 5, 6, 8B, 11, 27, 28, and FIG. 5 discusses 13B, 31, 32.)

Figure 4:
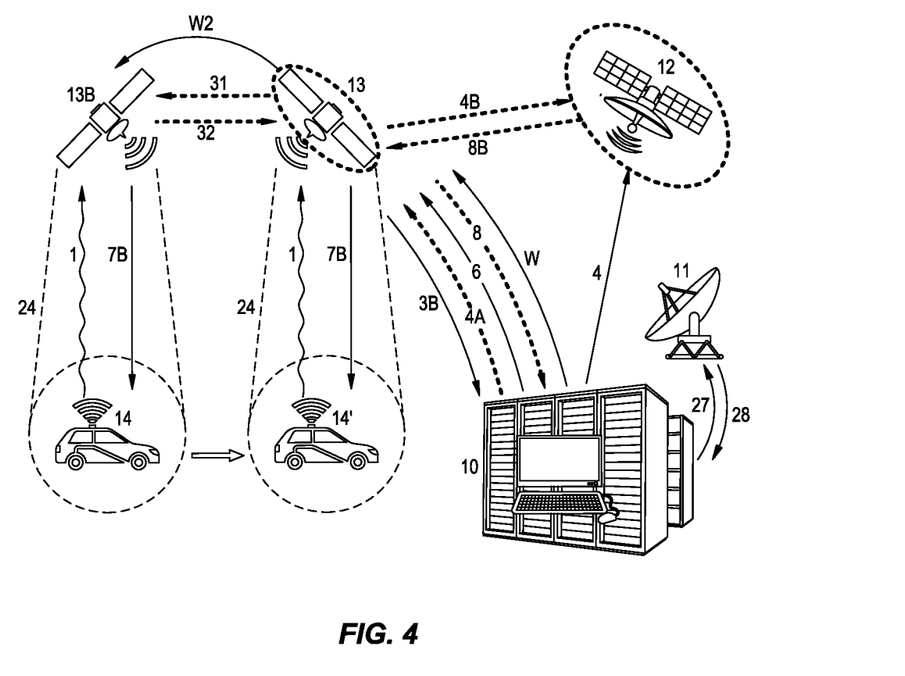
FIG. 4 depicts the bi-directional communication and interoperability between similar or disparate satellites and networks using inter-satellite optical link or other methods, and the data processing by the multi-link satellite processor of resulting information, which is sent as commands to the vehicles according to various embodiments of the invention.

As FIG. 4 illustrates, in certain situations one or more satellites (CommNets 12 or PrivNets 13) may not be proximate to vehicle 14. The multi-link satellite processor 10 utilizes bi-directional data flow between satellites 12, 13 using an inter-satellite optical link 4B, 8B, 31, 32 or otherwise to facilitate geographic coverage and to serve autonomous vehicles 14 in various areas 24 or otherwise, and the multi-link satellite processor 10 determines the relevance of the data 3B and what should be sent via 6 to command 7B the vehicles 14.

Also in FIG. 4, signal 1 is transmission of the vehicle 14 location code to PrivNets 13. Signal 3B provides the vehicle 14 location code to the multi-link satellite processor 10, which may then determine that no satellites are positioned directly above, in line-of-sight (LOS), or in proximity to the geofenced area covering the vehicle 14. The multi-link satellite processor 10 examines the location code via 1, 3B to determine the location of the preferred proximity satellite 12, 13 in a different geographic area, and multi-link satellite processor 10 initiates a request 4 to CommNets 12, or 4A, 4B via PrivNets to CommNets, or 4A to PrivNets, to obtain the data from the satellite(s) 8, 8B. The multi-link satellite processor 10 processes the 8, 8B data and transmits W to PrivNets 13, which passes the data W2 to PrivNets 13B using inter-satellite optical link (ISOL) or other method, where 13B is the preferred proximity satellite to the vehicle 14 to pass command 7B.

Figure 5:
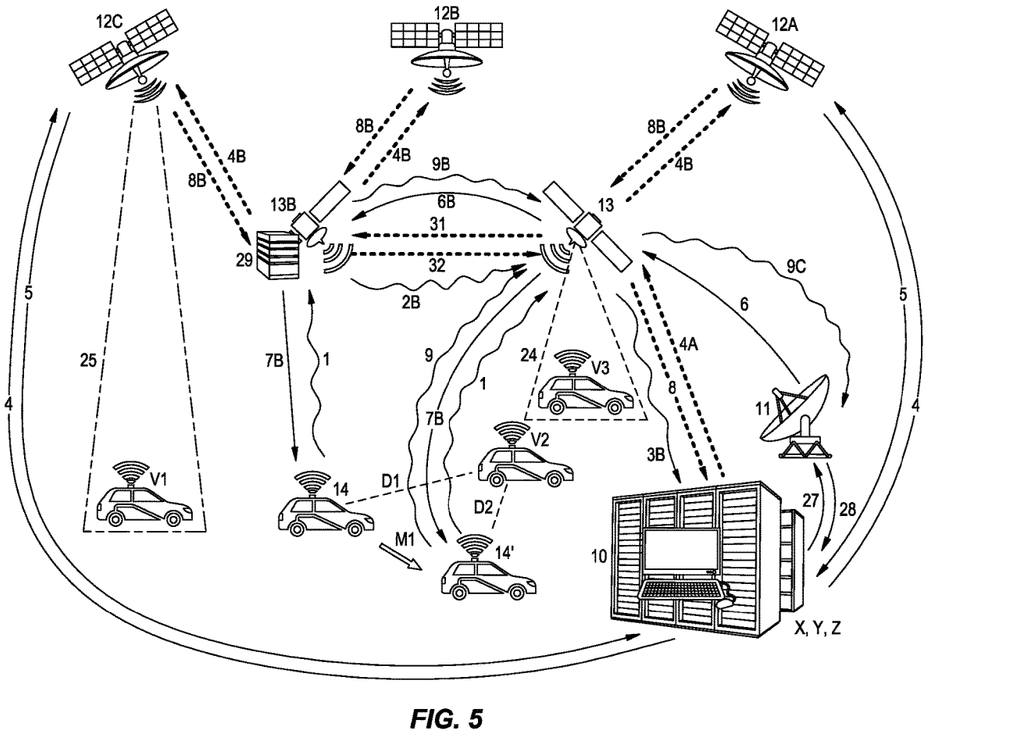
FIG. 5 illustrates the use and analysis of distinct features and capabilities of similar or disparate satellites and networks to command vehicle operation and maneuvers according to various embodiments of the invention.

Referring to FIG. 5, the multi-link satellite processor 10 uses and analyzes Y distinct features and capabilities of similar or disparate satellites and networks 12A, 12B, 12C, 13 to command 7B vehicle 14 operation and maneuvers M1 for vehicle 14 moving to 14' according to various embodiments of the invention. For example, CommNets 12A Pulse-Doppler radar data, sound waves or other methods are used to measure vehicle 14 distance from other objects V1, V2, V3; CommNets 12B is for telemetry which measures the size of stationary and non-stationary objects (as does 25 for imaging and transmitted via 5), and otherwise; CommNets 12C is for imaging 25 to determine vehicle 14 proximity to other objects V1, V2, V3 and sent via 5 to multi-link satellite processor 10, and otherwise; other features and capabilities may also be available from other satellites. The multi-link satellite processor 10 combines the information from 12A, 12B, 12C, and possibly other satellites, into one signal 6 via PrivNets 13, or from PrivNets 13 via 6B to PrivNets 13B, to transmit command 7B to the vehicle 14. After acting on commands, the vehicle 14 sends updated information via 9, 9B, 9C to the multi-link satellite processor 10, which processes the information using its software, database processing, artificial intelligence (AI) and predictive analytics X, Y, Z.

In FIG. 5, images provided in real-time or near-real-time from CommNets 12C (or PrivNets 13) to the multi-link satellite processor 10 are processed with the capability of zooming into areas surrounding the vehicle 14, and to make vehicle 14 decisions where the satellite imaging will substitute for the vehicle's 14 camera images depending on its capabilities, and eventually use all images from satellites 12C, 13, or otherwise when possible, and process them to make vehicle 14 decisions. CommNets 12C (or PrivNets 13, 13B) images also may be utilized to independently assist with a vehicle's 14 operation and maneuvers M1 in real-time or near-real-time in the event of vehicle 14 sensor or camera failure.

Also in FIG. 5, the multi-link satellite processor 10 needs to determine the distance between an autonomous vehicle 14 and its surrounding objects. The multi-link satellite processor 10 requests 4A for PrivNets 13 via 4B and requests 4 from CommNets 12A to provide Pulse-Doppler radar data or otherwise and transmit back signals 8B via PrivNets 13 to 8 to multi-link satellite processor 10 and/or from 12A via 5 back to the multi-link satellite processor 10. Then, the multi-link satellite processor 10 combines the data with preexisting vehicle codes (including timing and tracking), which have been saved and processed X, Y, Z. The multi-link satellite processor 10 generates 6 to PrivNets 13 including data about the distance from other objects within the requested area of vehicle 14 and the direction it is headed.

While only illustrated in FIG. 5, PrivNets 13 satellites may have on-board computers 29. The multi-link satellite processor 10 is able to communicate directly with vehicle 14 antennas and sensors, and PrivNets 13, through radio signals and/or via PrivNets' computers 29, or other methods.

Referring to FIG. 5, when the multi-link satellite processor 10 utilizes different signals from different satellites, PrivNets 13 uses multiplexing to combine signals from one or more CommNets 12 and/or PrivNets 13 satellites and networks.

Referring to FIG. 5, the multi-link satellite processor 10 may utilize frequency mounted wave radar or other methods to differentiate between stationary V3 and non-stationary vehicles 14, V1, V2.

In FIG. 5, as the vehicle 14 moves, the unique vehicle identification code remains the same for PrivNets 13 and multi-link satellite processor 10 for the purposes of tracking the vehicle 14; however, the vehicle 14 continuously transmits 1 and/or 9 ever-changing data including vehicle 14 location, timing, speed and other codes to update the multi-link satellite processor 10.

The following other methods and embodiments may or may not be illustrated by one or more figures:

Communications between the multi-link satellite processor 10, a plurality of satellites 12, 13, and a plurality of vehicles 14, may also be facilitated using "signal repeater method" or other method.

The multi-link satellite processor 10 enables the complete control of a vehicle 14 via satellites 12, 13, and supplements and/or supplants the autonomous vehicle capabilities for maneuvering purposes (like changing lanes), or in the event of a malfunction or deficiency with vehicle 14, sensors, cameras, antennas or other equipment, including vehicles 14 that may be sensor-free or sensor-light, without using actuators, which offers economic benefits to vehicle cost.

The multi-link satellite processor 10 provides database processing, artificial intelligence (AI) and predictive analytics that generates information (via satellites or otherwise) to vehicles 14 about areas where vehicle 14 cameras can't see and where sensors can't detect, which also helps predict areas outside of the vehicles' 14 radar, LiDAR, sensors, antennas, and camera range covered by other satellites, so the multi-link satellite processor 10 can anticipate what will happen next, and provide commands 7B to vehicle 14 to act.

In situations where the vehicle 14 may be located on another continent or geographic area relative to the multi-link satellite processor's 10 software and equipment, and PrivNets 13 and CommNets 12 satellites may not be in the current vehicle 14 coverage area, then communications between vehicle 14, satellites 12, 13 and multi-link satellite processor 10 may occur via relaying data between multiple satellites, or from satellite to ground stations, and/or transmitted via ground-based, air-based or other communications such as fiber optic, microwave, radio or sound waves, lasers/optical, LED-based visible light communications (VLC), vehicle-to-vehicle (V2V), or other methods, or utilize space station hubs regionally or worldwide like an ground station or otherwise.

The software and systems that comprise the multi-link satellite processor 10 need not merely be stationary and ground-based. The multi-link satellite processor 10 may operate ubiquitously, regardless of location or host, including in stationary and mobile data centers, ground stations, on trucks, trains, airplanes and aerial vehicles, boats, and otherwise, such as Vehicle-Mounted Earth Stations (VMES) and Satellite On-The-Move (SOTM) terminals, including the multi-link satellite processor 10 software running in/on the satellites (like PrivNets 13, CommNets 12 or otherwise), and in/on the vehicles 14 themselves.

Various embodiments of the invention may include computer software, a mobile device-based application or website for the reporting and charting of data, processing, and control concerning the autonomous vehicles 14, PrivNets 13 and/or CommNets 12. Such software, applications or website can be operated on a computer, mobile phone, wearable device, or other equipment.

Aspects of the present invention may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation or a software/hardware implementation. Hardware-implemented functions may be realized using ASIC(s), programmable arrays, digital signal processing circuitry, or the like. The term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present invention may further relate to computer products with a non-transitory, tangible computer-readable medium that have computer code thereon for performing various computer-implemented operations. The media and computer code may be those specially designed and constructed for the purposes of the present invention, or they may be of the kind known or available to those having skill in the relevant arts. Examples of tangible computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that are executed by a computer using an interpreter. Embodiments of the present invention may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present invention. One skilled in the art will also recognize that a number of the elements described above may be physically and/or functionally separated into sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A method for generating vehicle command signals from a multi-link satellite processor, the method comprising:
    transmitting a first signal from a vehicle to a first low-Earth orbiting satellite, the first signal comprising a code that uniquely identifies the vehicle and the vehicle location, timing and speed;
    receiving a second signal from a second low-Earth orbiting satellite, the second signal being generated from a third signal received at the second low-Earth orbiting satellite from a commercial satellite; and
    wherein the second signal comprises command information for the vehicle based on an analysis of a geofenced area surrounding the vehicle, the geofenced area being identified after transmission of the first signal to the first low-Earth orbiting satellite.

2. The method of claim 1 wherein the first and second low-Earth orbiting satellites are the same low-Earth orbiting satellite.

3. The method of claim 1 wherein the geofenced area is identified by a multi-link satellite processor coupled to the commercial satellite.

4. The method of claim 1 wherein the third signal is generated by the commercial satellite in response to receiving a fourth signal from a multi-link satellite processor.

5. The method of claim 4 wherein database processing, artificial intelligence and predictive analytics processes are used in generating the fourth signal.

6. The method of claim 1 wherein the vehicle is an autonomously controlled automobile vehicle.

7. The method of claim 1 wherein the vehicle is a semi-autonomously controlled vehicle.

8. The method of claim 1 wherein the third signal is an inter-satellite optical link communicatively coupling a commercial satellite with the first low-Earth orbiting satellite, or coupling the first low-Earth satellite with another low-Earth satellite.

9. The method of claim 1 wherein the second signal comprises command information to supplement on-board vehicle control processes.

10. The method of claim 9 wherein the command information comprises at least one of weather information, location of an object proximate to the vehicle, timing, size of stationary and non-stationary objects proximate to the vehicle, images, information about the geofenced region surrounding the vehicle, distance from another vehicle, speed and acceleration of the vehicle, and maneuvers.

11. The method of claim 1 wherein the first and second signals are encrypted.

12. A method for controlling a multi-link satellite processor system that communicates command information to a vehicle, the method comprising:
    receiving a first signal at a multi-link satellite processor from a first commercial satellite or the first low-Earth orbit satellite, the first signal comprising a code that uniquely identifies a vehicle and its location, timing and speed;
    processing the first signal and requesting from a low-Earth orbit satellite a geofence around the vehicle;
    generating command information by analyzing information related to a plurality of objects within the geofenced area, the command information related to control of the vehicle;
    transmitting a second signal to a second commercial satellite, the second signal comprising the command information; and
    wherein the second signal is provided to the vehicle via a multi-link downlink satellite signal, the multi-link downlink satellite signal being transmitted by the second commercial satellite and proximate low-Earth orbiting satellites.

13. The method of claim 12 wherein the first commercial satellite and the second commercial satellite are the same commercial satellite.

14. The method of claim 12 wherein the vehicle is an autonomously controlled vehicle.

15. The method of claim 12 wherein the vehicle is a semi-autonomously controlled vehicle.

16. The method of claim 12 wherein the information related to a plurality of objects within the geofence comprises at least one of location of a first object proximate to the vehicle, size of objects proximate to the vehicle, images, information about geofenced region surrounding the vehicle, distance from another vehicle, speed and acceleration of the vehicle, and maneuvers.

17. The method of claim 12 wherein the multi-link downlink satellite signal comprises command information to supplement on-board autonomous control processes within the vehicle.

18. The method of claim 12 wherein the first signal and the multi-link downlink satellite signal are encrypted.

19. The method of claim 12 wherein the vehicle is automobile, truck, bus, train, robot, drone, space vehicle, airplane, ship or submarine.

* * * * *